United States Patent [19]

Schlenk et al.

[11] 4,383,183
[45] May 10, 1983

[54] CONTROL ARRANGEMENT FOR A UNIFORM LOAD DISTRIBUTION OF AT LEAST TWO POWER SUPPLY DEVICES CONNECTED IN PARALLEL AT THE OUTPUT SIDE

[75] Inventors: Manfred Schlenk, Augsburg; Erich Schmidtner, Munich, both of Fed. Rep. of Germany

[73] Assignee: Siemens Aktiengesellschaft, Berlin & Munich, Fed. Rep. of Germany

[21] Appl. No.: 390,332

[22] Filed: Jun. 21, 1982

[30] Foreign Application Priority Data

Jul. 31, 1981 [DE] Fed. Rep. of Germany ....... 3130356

[51] Int. Cl.³ .............................................. H02J 3/38
[52] U.S. Cl. .................................................... 307/43
[58] Field of Search ....................... 307/18, 43, 44, 52, 307/53

[56] References Cited

U.S. PATENT DOCUMENTS

| | | | |
|---|---|---|---|
| 2,701,858 | 2/1955 | Bakeman et al. | 307/43 UX |
| 3,356,855 | 12/1967 | Suzuki et al. | 307/53 |
| 3,433,971 | 3/1969 | Hufford | 307/18 |
| 3,818,237 | 6/1974 | Straus | 307/18 X |

Primary Examiner—Donald A. Griffin
Attorney, Agent, or Firm—Hill, Van Santen, Steadman, Chiara & Simpson

[57] ABSTRACT

A control arrangement for the uniform load distribution of at least two power supply devices connected in parallel at their outputs and designed as switch controllers having pulse width modulators provides a common voltage regulator for the power supply devices and a respective non-steady and a steady current regulator per power supply device. The control outputs of three respective regulators are connectred to maximum value selection circuits which precede the pulse width modulators. In three-phase operation having a center conductor of such devices, a uniform load distribution to each device and, therefore, a balancing of the three-phase network is achieved by substituting a proportional-integral controller for the non-steady current regulators and forming the difference of the output currents of the switch controllers with the proportional-integral controller so that the controlling variable at the output thereof is supplied to one maximum value selection circuit via an inverter and is directly supplied to the other maximum value selection circuit.

5 Claims, 6 Drawing Figures

CONTROL ARRANGEMENT FOR A UNIFORM LOAD DISTRIBUTION OF AT LEAST TWO POWER SUPPLY DEVICES CONNECTED IN PARALLEL AT THE OUTPUT SIDE

BACKGROUND OF THE INVENTION

1. Field of the Invention

The present invention relates to a control arrangement for uniformly distributing a load of at least two power supply devices which are connected in parallel at their outputs, designed as switch controllers having pulse width modulators for control and comprising a voltage regulator shared by the respective power supplies and a respective non-steady and a steady current regulator per power supply, whereby the regulator outputs of three respective regulators are respectively conducted to an extreme value selection device connected ahead of the pulse width modulators.

2. Description of the Prior Art

Power supply devices having a high output power and a single-phase mains connection load the three-phase network in a highly unsymmetrical manner in various applications. Since combinatorial circuit parts directly rectify the mains voltage and a following high capacity must be loaded for the purpose of high storage time, the charging current peaks in single-phase operation resulting therefrom are particularly disruptive. The use of the three phases and of the center product conductor, however, presumes that no direct current is fed over the center conductor, this being achieved by a corresponding circuit arrangement. Such a circuit format, however, presupposes a precise load current distribution.

SUMMARY OF THE INVENTION

The object of the present invention is to provide a control arrangement for a uniform load distribution of at least two power supply devices connected in parallel at the output side by means of which a uniform load distribution to all power supply devices connected in parallel is made possible at any time.

According to the invention, and in order to achieve the foregoing object, the steady current regulators of the control arrangement are designed in such a manner that the difference formed by the output direct currents of two respective power supply devices is supplied to a PI controller and in that the output quantity available at its output is supplied to the one extreme value selection device by way of an inverter and is directly supplied to the other extreme value selection device.

By way of the foregoing measures, uniform load distribution is guaranteed at any time of operation of the power supply devices connected in parallel. This arrangement can be particularly favorably employed given three-phase systems having a center conductor because, by so doing, a symmetrical load of all three phases is guaranteed and charging current peaks are correspondingly lower.

The invention can be further developed in such a manner that, given more than two power supply devices, the difference of the output quantities of two respective PI controllers is supplied to a further PI controller and that the output quantity obtained in this manner is directly supplied to the one pair of the power supply devices and is indirectly supplied, via an inverter, to the other pair of power supply devices; and that the formation law thus specified is correspondingly employed given more than four power supply devices.

By so doing, one obtains an accurate load distribution, even given more than two power supply devices connected in parallel.

In order to prevent the ripple of the output current from causing control disruptions, the output direct currents of the power supply devices can be filtered.

It is advantageous that all pulse width modulators by synchronized with one another. By so doing, a rigid phase relationship of zero or, respectively, 180° of the two converters relative to one another is effected, as a result of which even small load skips concerning the current distribution of both power supply devices can be precisely leveled.

In order to avoid hunting during cut-in, the power supply devices can also be provided with a soft start device which operates over the extreme value selection device.

BRIEF DESCRIPTION OF THE DRAWINGS

Other objects, features and advantages of the invention, its organization, construction and operation will be best understood from the following description, taken in conjunction with the accompanying drawings, on which.

DESCRIPTION OF THE PREFERRED EMBODIMENTS

Figure 1:
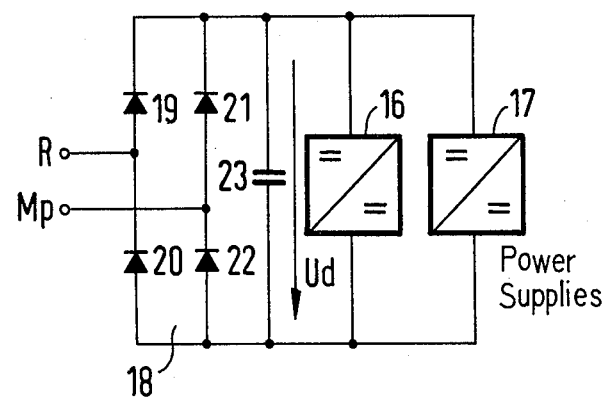
FIG. 1 is a schematic illustration of a single-phase connection of two power supply devices connected in parallel.

FIG. 1 illustrates a single-phase circuit of two power supply devices connected in parallel. The two combinatorial circuit portions 16 and 17 are connected in parallel with the output of a common rectifier 18 comprising four diodes 19, 20, 21 and 22 and a capacitor 23. The voltage Ud at the output of the rectifier feeds the two circuits 16 and 17.

Figure 2:
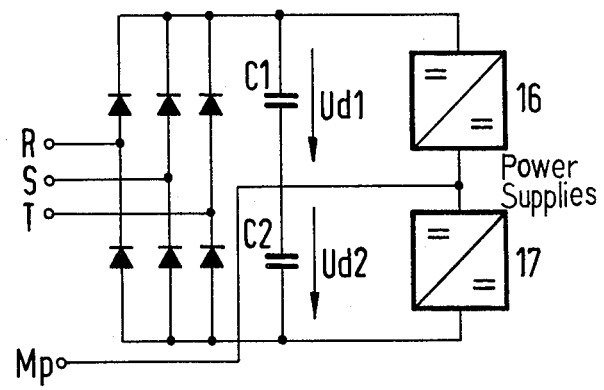
FIG. 2 is a schematic illustration of a three-phase connection of two power supply devices connected in parallel.

In three-phase operation, the direct voltage Ud generated in the single-phase operation for the feed of the parallel circuits is identical in respective halves (Ud1, Ud2) in three-phase operation having a center conductor. Since the two circuits 16 and 17 respectively lie between respective phases of the three-phase network and the center conductor (FIG. 2), the voltage Ud1, however, would be unequal to the voltage Ud2 because of the standard tolerance of −20% and +80% of the capacitance of the capacitors C1 and C2 following the three-phase rectifier, whereby, in the least favorable case, the voltage difference could even amount to the voltage Ud1 being twice that of the voltage Ud2.

Figure 3:
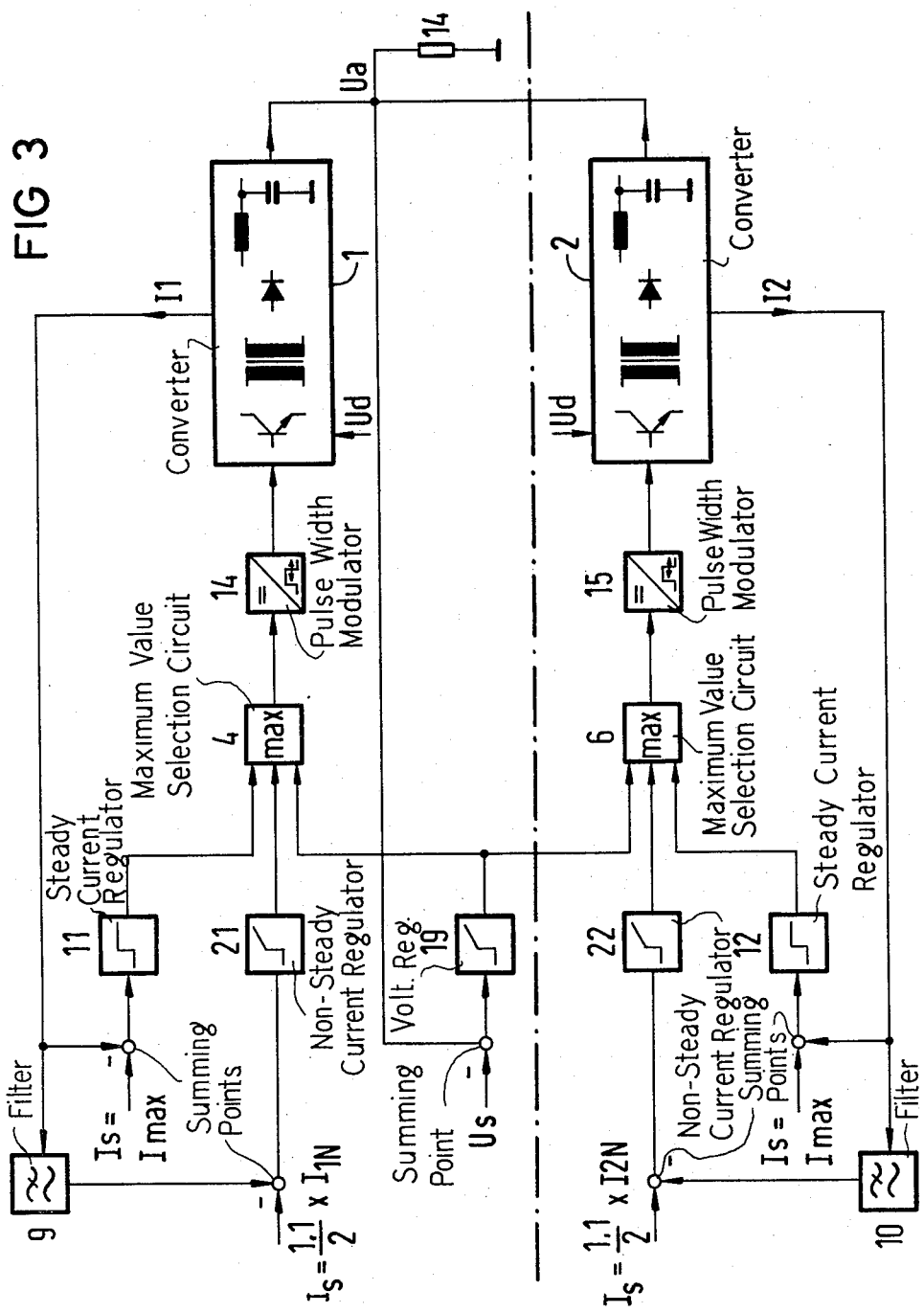
FIG. 3 is a schematic representation of a standard control circuit for the load distribution given power supply devices connected in parallel.

FIG. 3 illustrates a conventional control circuit for two power supply devices connected in parallel. A respective pulse width modulator influenced by maximum value selection circuits 4, 6 are connected ahead of a pair of converters 1 and 2. The control occurs with the assistance of a voltage regulator 19 shared in common by both power supply devices, in which a prescribed reference voltage U SOLL and an output director voltage UA of the rectifiers 1, 2 which influence the load 14 are compared to one another. The input direct currents I1 and I2 of the converters 1 and 2 are smoothed by filters 9 and 10 and each is likewise separately compared to a reference value. The reference voltages obtained in such a manner are supplied to steady current regulators 21 and 22, at whose outputs the regulating variables for the current regulation are obtained and are likewise supplied to the maximum value selection devices. Respective third inputs of the maximum value selection circuits 4 and 6 are connected to outputs of non-steady current regulators 21 and 22, whereby the reference value I SOLL supplied to these current regulators is a maximum current value which dare not be exceeded. The respectively larger of the three deviations punches through into the maximum value selection circuits 4 and 6 and controls the pulse duration of the modulators 14 and 15 and, therefore, the switch controllers in the autoconverters whereby a change of load distribution in the dc converters 1 and 2 is achieved. Thereby, the two converters 1 and 2 operate entirely independently of one another. Depending on the component or, respectively, setting tolerances, a conversion carries the maximally-admissible current. This disadvantage, which can still be accepted given single-phase operation leads to an asymmetrical load of the center conductor given a three-phase device.

Figure 4:
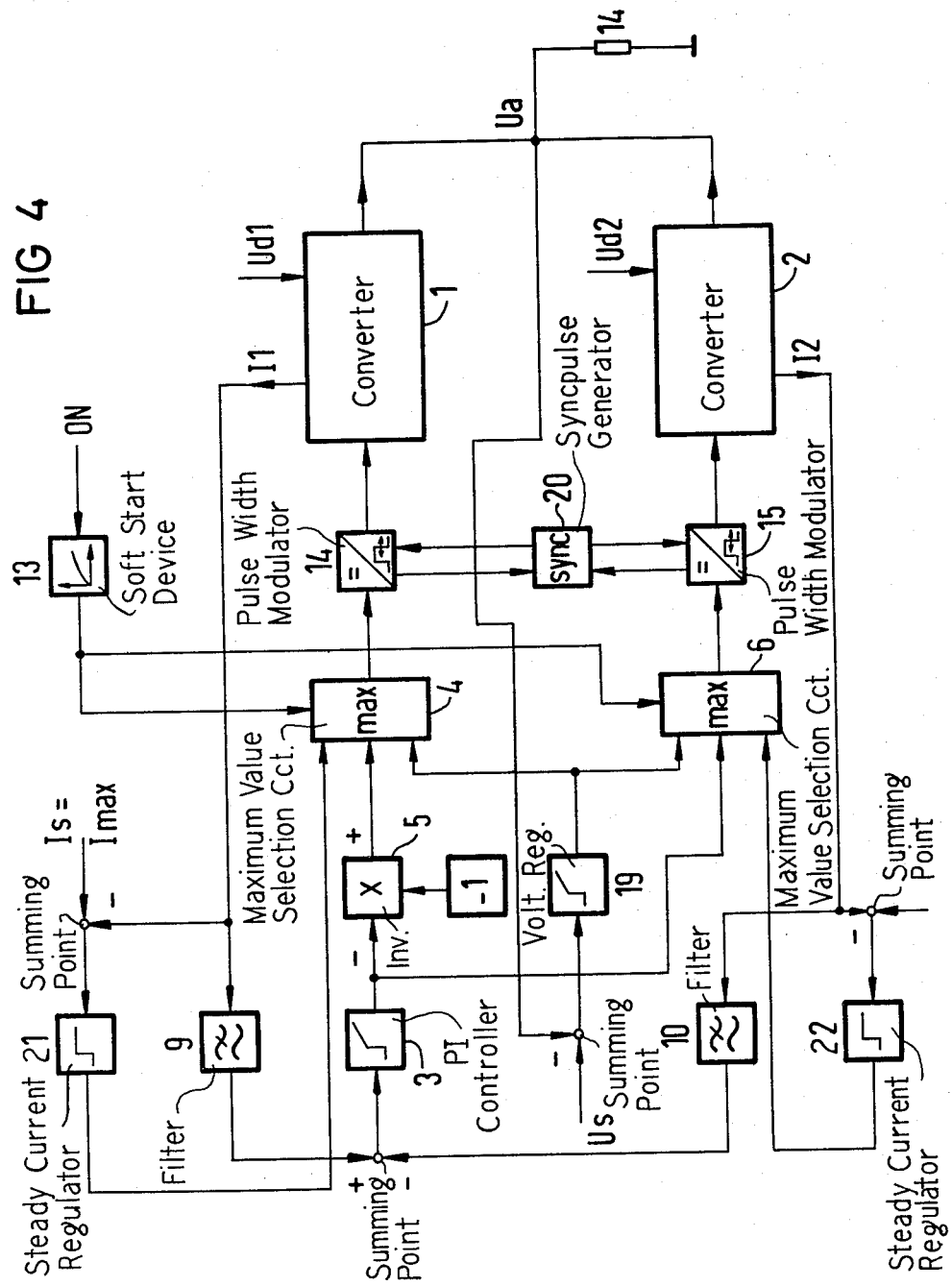
FIG. 4 is a schematic representation of a control circuit constructed in accordance with the present invention.

FIG. 4 illustrates a control circuit according to the present invention in which the above disadvantage is eliminated. A proportional-integral controller 3 whose output control voltage is supplied to the maximum value selection circuits 4, 6 either directly or by way of an inverter 5, is substituted in the place of the steady current regulators 21 and 22. By so doing, the difference of the two output direct currents I1, I2 of the converters 1, 2 is supplied to the input of the PI controller. This occurs in that the current of the converter 2 is conducted over a further inverter (not illustrated). Moreover, the output direct current of the converters 1, 2 are filtered with the assistance of respective filters 9 and 10, so that disruptive influences due to the ripple of these currents are avoided in the control operation. In order to create rigid phase relationships of the pulse width modulators 14 and 15, the same are synchronized with the assistance of the synchronous generator 20. In order to avoid hunting during cut-in or, respectively, given load skips, an additional soft start device 13 is provided which influences the converters 1 and 2 over the maximum value selection devices 4 and 6.

By incorporating the foregoing structure, the control device according to the present invention operates like an electric scale. When, for example, the output direct current I1 of the converter 1 rises, then the differential voltage at the input of the proportional-integral control 3 likewise increases and, as a result of the inverter 5, effects a reduction of the pulse duration of the width modulator 14 and an extension of the pulse of the pulse width modulator 15 which, of course, is directly influenced by the controlling variable without an intervening inverter. As a result, the current I1 of the converter 1 is reduced and the output direct current I2 of the converter 2 is increased so that the load is again uniformly distributed.

Given current skips which are too high, the non-steady current regulation takes effect and shuts off the entire power supply device in that the pulse width modulator is practically brought to a standstill.

Figure 5:
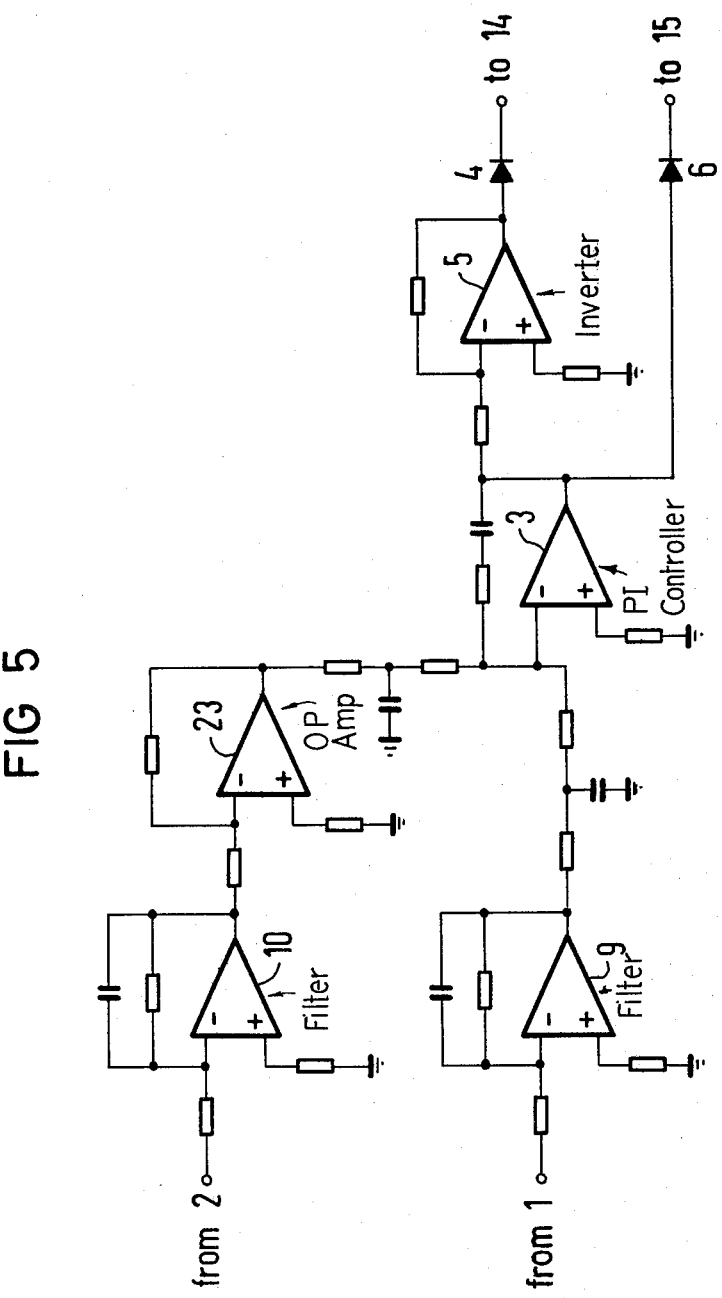
FIG. 5 is a schematic circuit diagram illustrating the control portion of the control circuit of FIG. 4.

The detailed circuit of such a current balancing can be seen from FIG. 5. In FIG. 5, each autoconverter 1, 2 (not illustrated in FIG. 5) supplies a voltage proportional to the switch regulator 1 or, respectively, a current I2 which is respectively filtered with the assistance of the filters 9 and 10 which are constructed with operational amplifiers. So that both values can be subtracted from one another, the output voltage of the filter 10 is inverted with the assistance of an operational amplifier 23. The difference is forwarded to the PI controller 3 which is likewise designed as an operational amplifier. The PI controller, given a difference which may exist, generates a corresponding output voltage which is connected with different polarity to the two pulse width modulators of the two switch controllers. The different polarity is achieved with the assistance of the inverter 5, also designed as an operational amplifier, whose output is connected to the maximum value selection circuit 4 of FIG. 4, whereas the non-inverted output of the PI controller 3 is connected to the maximum value selection circuit 6. For the sake of simplicity, the maximum value selection devices 4 and 6 have been illustrated as diodes in FIG. 5. The outputs of these diodes are then connected to the pulse width modulators 14 and 15.

Figure 6:
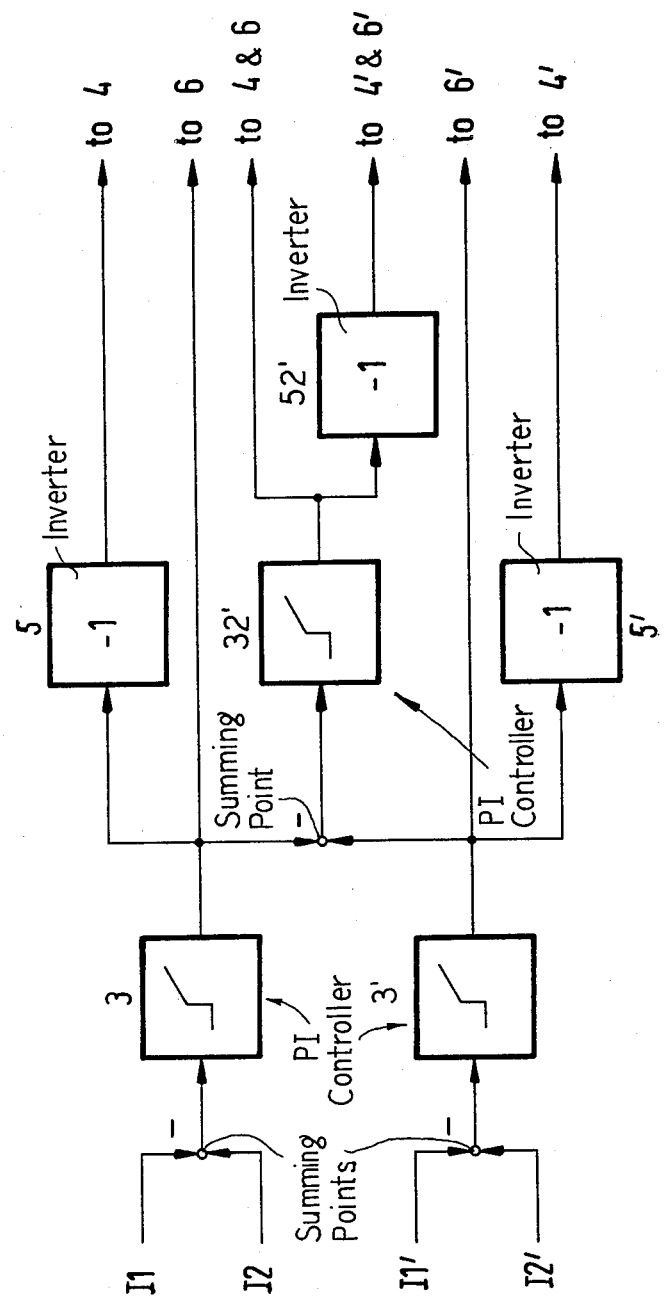
FIG. 6 is a schematic circuit diagram of a control circuit, constructed in accordance with the present invention, and having four power supply devices connected in parallel.

FIG. 6 illustrates how the current balancing described above can be expanded to more than two power supplies. It is thereby presumed that the power supply system as shown in FIG. 3 is expanded by two further power supply devices. These two further power supply devices are referenced 1' and 2', and are indicated, but not illustrated, on the drawing.

First, the difference of the output direct currents I1, I2 or, respectively, I1', I2' is again formed and supplied to respective PI controllers 3 or, respectively, 3'. The output regulating variables of the PI controllers, as illustrated in FIG. 4, are supplied to the converters 1, 2 or, respectively, 1', 2'. Moreover, a further difference formation is undertaken from the two controlling variables which have been obtained at the output of the PI controllers 3 and 3', this being input to a third PI controller 8. The output of the PI controller 32' is again directly supplied, on the one hand, to the maximum value selection circuits of the first converter group and is supplied, on the other hand, to the other two maximum value selection devices 4', 6' via an inverter 52'. Therefore, the principle of the electric scale is first applied to the power supply consisting of two combinatorial circuit portions and is then applied to the two groups of power supplies. An expansion of this principle to a random plurality of power supply units connected in parallel is possible by further cascading according to FIG. 6.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a control arrangement for providing uniform load distribution of at least two power supply devices, in which each power supply device comprises a converter having an input and first and second outputs, a pulse width modulator connected to said input, a maximum value selection circuit connected to said pulse width modulator, a steady and a non-steady current regulator connected to the maximum value selection circuit along with a commonly-shared voltage regulator, means commonly connecting the first output of each converter to the voltage regulator, and in which the second output is connected to the steady current regulator and to the non-steady current regulator, the improvement therein comprising:

a proportional-integral controller interposed between the second outputs and the maximum value selection circuit in place of the non-steady current regulators, said proportional-integral controller directly connected to one of the maximum value selection circuits; and an inverter connecting the proportional-integral controller to the other maximum value selection circuit.

2. The improved control arrangement of claim 1, for more than two power supply devices, the improvement further comprising:

an additional proportional-integral controller for each two pair of power supply devices interposed between the respective mentioned controllers and the respective maximum value selection circuits, being directly connected to one of the maximum value selection circuits; and an additional inverter connecting said additional proportional-integral controller to the other maximum value selection circuit.

3. The improved control arrangement of claim 1, and further comprising:

a respective filter connected between a second output and the respective maximum value selection circuit.

4. The improved control arrangement of claim 1, and further comprising:

synchronizing means connected to and operable to synchronize the operation of the pulse width modulators.

5. The improved control arrangement of claim 1, and further comprising:

a soft start device connected to and operable over the maximum value selection circuits.

* * * * *